United States Patent [19]

Han

[11] Patent Number: 5,769,111
[45] Date of Patent: Jun. 23, 1998

[54] LEAK DETECTOR

[75] Inventor: Joseph U. Han, Rancho Cucamunga, Calif.

[73] Assignee: Fluidmaster, Inc., Anaheim, Calif.

[21] Appl. No.: 779,678

[22] Filed: Jan. 7, 1997

[51] Int. Cl.$^6$ .............................. F16K 31/22; F16K 33/00
[52] U.S. Cl. ................................. 137/312; 4/324; 4/366; 4/415; 73/322.5; 137/410; 137/427; 137/432; 137/437
[58] Field of Search .................................. 137/410, 418, 137/420, 421, 430, 432, 436, 437, 427; 4/324, 366, 415; 73/322.5

[56] References Cited

U.S. PATENT DOCUMENTS

| | | | |
|---|---|---|---|
| 4,703,653 | 11/1987 | Schoepe et al. | 137/429 |
| 4,843,657 | 7/1989 | Orr | 137/410 |
| 4,965,891 | 10/1990 | Antunez | 137/410 |
| 5,179,739 | 1/1993 | Mann | 137/410 |
| 5,211,204 | 5/1993 | Mikol | 137/410 |
| 5,232,011 | 8/1993 | Royalty | 137/410 |
| 5,285,533 | 2/1994 | Chen | 137/410 |
| 5,327,931 | 7/1994 | Royalty | 137/410 |
| 5,524,299 | 6/1996 | Dalfino | 137/410 |
| 5,542,448 | 8/1996 | Campbell et al. | 137/410 |

*Primary Examiner*—George L. Walton
*Attorney, Agent, or Firm*—Freilich Hornbaker Rosen

[57] ABSTRACT

Leak detector apparatus (40) is provided for use with a toilet inlet valve assembly (12) that includes a float (30) slidable along a vertical post (32), which can be easily installed by a handyman. The leak detector apparatus includes a buoyant body (42) and a mount (44) that pivotally supports the body about a body axis (54) on the float (30). The body has a forward end portion (56) that can engage the post to prevent the float from moving down until a chain device (60) attached to the rear of the body is pulled to pivot the body. The body has a center of buoyancy (80), when immersed in water, which lies forward of the body axis, so when immersed the body urges its forward end portion against the post to prevent the float from moving down. The forward portion of the body can include a metal strip with a sharp edge (74) that "digs" into the inlet valve plastic post. The mount includes a pair of upstanding mount posts (114) that project into air holes (112) on the float.

14 Claims, 3 Drawing Sheets

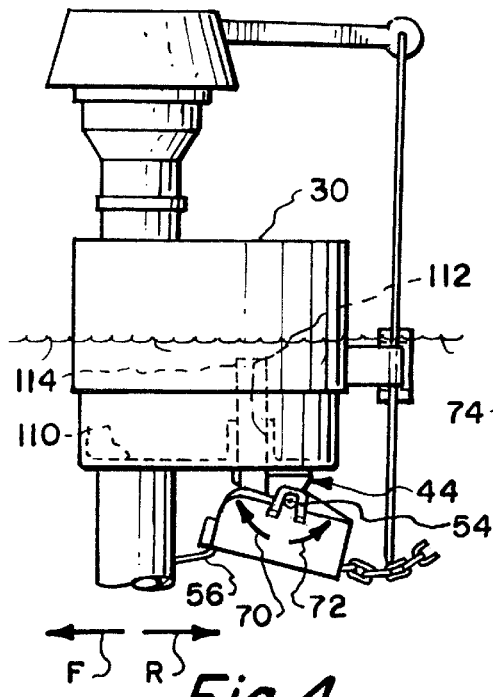
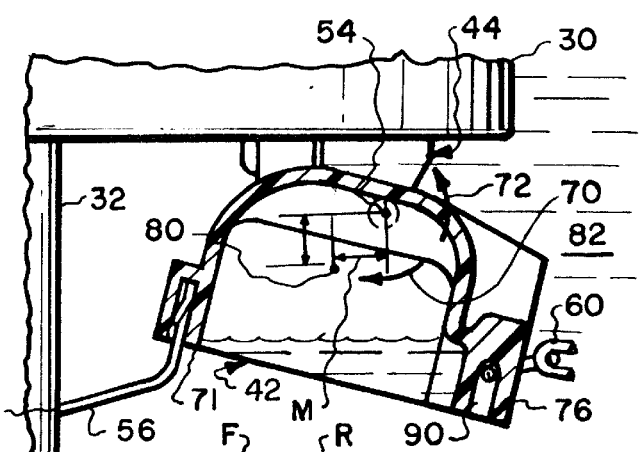
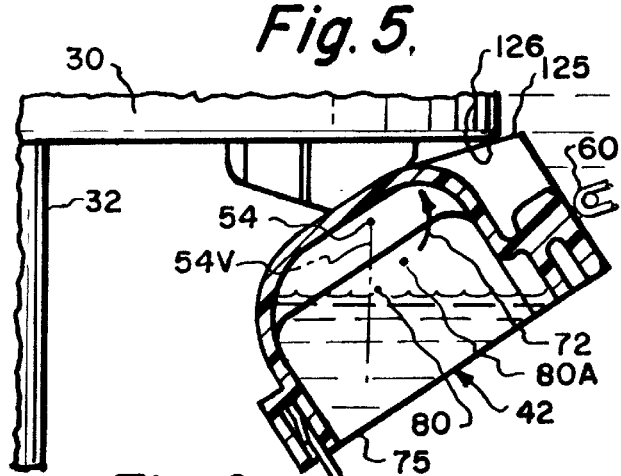
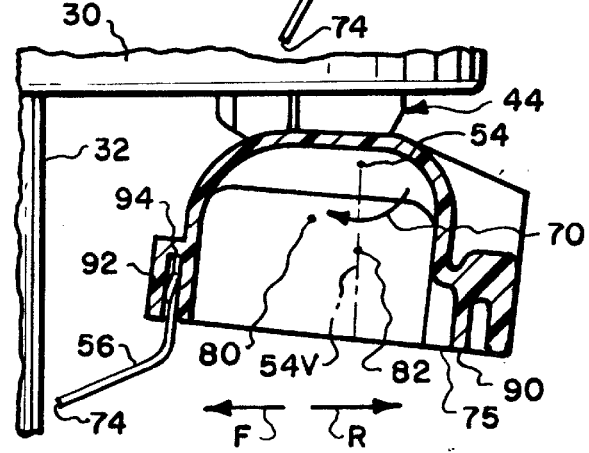
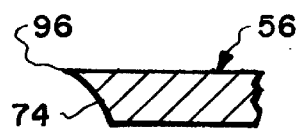
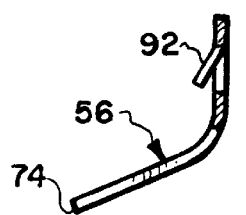
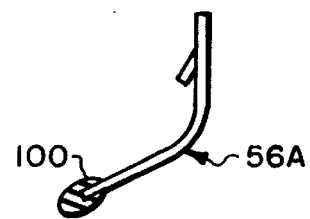

LEAK DETECTOR

BACKGROUND OF THE INVENTION

Toilet flush valves sometimes leak, allowing the water in the tank to slowly leak out into the toilet bowl and down the drain. Whenever the leakage has caused the water level to drop perhaps a centimeter below its shut-off level, the water inlet valve opens and quickly refills the tank. Because of the fact that the tank is always almost completely filled, a person using the toilet may not notice any problem, and the slow leak may continue for a long period of time and waste a lot of water.

Leak prevention devices have been proposed to prevent the inlet valve from opening until a person has operated the flush handle to purposely flush the toilet. As a result, a leaky flush valve will result in all water draining out of the tank, so a person attempting to flush the toilet will only cause the tank to refill, and the toilet can be flushed only about a minute later. This has the advantage of avoiding continuous leakage during long periods between flushings, and in making the user well aware of the fact that "something" is wrong with the toilet so he/she can urge replacement of the flush valve.

In order for leak detectors to be readily accepted, they should be of low cost and be easily mountable in place. U.S. Pat. No. 4,965,891 shows a relatively simple leak detector. However, it requires modification of an inlet valve post, which a "do-it-yourself" handyman cannot make. Also, it does not provide a convenient way of attaching a bracket to the inlet valve float. Further, it will not operate if the shut-off level of the float changes slightly. It should be noted that the most popular types of inlet valves have floats that slide along vertical posts, such as described in U.S. Pat. No. 4,100,928. The most common type of float for such valves is the type described in U.S. Pat. No. 4,703,653 that has a top wall with an air escape hole and a bottom wall with a pair of water drain holes. A leak detector of simple construction, which could be readily installed by a handyman, would be of considerable value in saving water.

SUMMARY OF THE INVENTION

In accordance with one embodiment of the present invention, a leak detector apparatus is provided for use with an inlet valve assembly, which can be easily installed. The apparatus includes a buoyant body and a mount that can be attached to the inlet valve float. The mount pivotally support the body about a body axis wherein the body lies underwater between flushings. The body has a front portion that can engage a vertical post along which the float slides. This prevents the body and float from moving down until the body is pivoted to move its front portion away from the post by manual operation of a toilet flush handle. The body has a center of buoyancy and a center of gravity. The center of gravity positions the center of buoyancy so it lies forward of the body axis as water rises to immerse the body. As a result, the body front portion tends to pivot against the post when the body is immersed.

The forward portion of the body can include a metal part with a sharp edge that "digs" into a plastic inlet valve post. This avoids the need to modify a typical plastic inlet valve post.

The mount that supports the hollow body on the float, can be especially easy to install where the float is of the type that has a bottom wall with a pair of water holes. In that case, the mount can include one or two mount posts that are projected upwardly into the air holes.

The novel features of the invention are set forth with particularity in the appended claims. The invention will be best understood from the following description when read in conjunction with the accompanying drawings.

BRIEF DESCRIPTION OF THE DRAWINGS

FIG. 4 is a side elevation view of the upper portion of the toilet inlet valve assembly of FIG. 1 with the leak detector apparatus installed.

FIG. 5 is a sectional side view of the leak detector apparatus of FIG. 4, shown in its usual position, which it assumes between flushings.

FIG. 6 is a view similar to that of FIG. 5, but after the rear of the body has been pulled up to begin a flushing, and then released, and while the buoyant body is still immersed in water.

FIG. 7 is a view similar to that of FIG. 5, but after a flushing and before tank refill, when the buoyant body is not immersed in water.

FIG. 8 is an enlarged view of the metal post-engaging part of the buoyant body of FIGS. 5–7.

FIG. 9 is a side elevation view of the post engaging part of the buoyant body of FIGS. 5–7, when not installed in the body part of the body.

FIG. 16 is a sectional side view of a post engaging part constructed in accordance with another embodiment of the invention.

DESCRIPTION OF THE PREFERRED EMBODIMENTS

Figure 1:
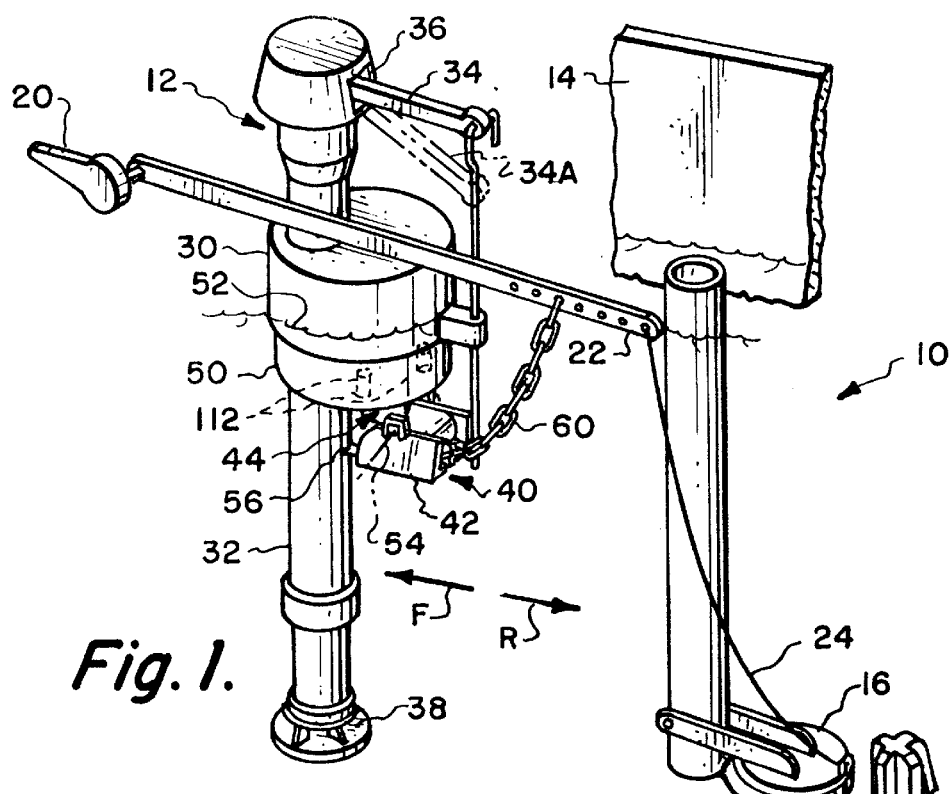
FIG. 1 is a partial isometric view of a toilet with the leak detector apparatus of the present invention installed thereon.
Figure 3:
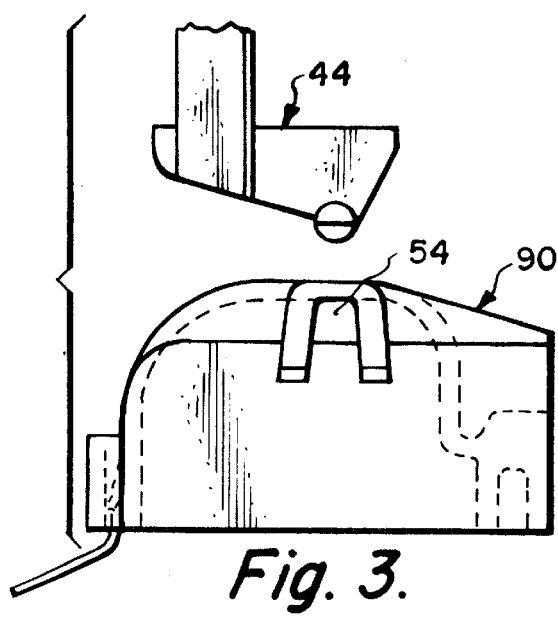
FIG. 3 is an exploded side elevation view of the apparatus of FIG. 2.

FIG. 1 illustrates the tank region 10 of a toilet, which includes an inlet valve assembly 12 that passes water into the tank 14 and a flush valve 16 that releases the water to flow to a toilet bowl. When a person operates a flush handle 20, he/she causes a flush bar 22 to rise and lift the flush valve 16. A chain device 24 which can be a chain, strap, or other device that is preferably flexible, connects the flush bar to the flush valve. When the water level in the toilet drops, a float 30 of the toilet valve assembly, moves down along a post 32, causing a valve lever 34 to move down and open an inlet valve 36. The post 32 includes two conduits, including an inner one that allows pressured water to flow up to the inlet valve 36, and an outer one that allows water to flow down from the inlet valve and exit through openings 38 lying near the bottom of the tank.

Applicant provides a leak detector apparatus 40 that prevents the float 30 from sliding down along the post 32 and opening the inlet valve 36, unless the flush handle 20 is first operated. If the flush valve 16 leaks, this will prevent the inlet valve 36 from repeatedly opening to replenish the leaked water, and thereby limit the amount of leaked water and make it apparent to the user that something is wrong with the toilet. The leak detector apparatus 40 includes a body 42 that is buoyant when immersed in water and a mount 44. The mount is attached to the float 30 at a lower portion 50 thereof which lies below the water level 52 normally existing between flushings, so the body is normally immersed in water.

The body is pivotally supported along a body pivot axis 54 and tends to pivot to a position wherein a post-engaging part 56 of the body engages the post 32. The engagement is such that it can prevent the float 30 from sliding down along the post 32 when the water level drops. However, a coupling in the form of a chain device 60 connects the body 42 to the flush bar 22. As a result, when a person depresses the flush handle to lift the flush bar 22, the body 42 is forcefully pivoted so its post-engaging part 56 moves away from the post 32, which allows the float 30 to move down. Thus, the leak detector apparatus 40 prevents the float 30 from moving down and opening the inlet valve 36 to refill the tank, unless a person has operated the flush handle 20 to purposely open the flush valve 16. The flush bar 22 and chain device 60 form a coupling that couples the flush handle 20 to the buoyant body 42.

FIG. 5 illustrates some details of the buoyant body 42. The body lies rearward (R) of the vertical post 32, with most of the body lying below the body axis 54. As a result, when the body pivots in a clockwise direction 70, the body forward or front end portion 71, which forms the post-engaging part 56, moves both upward and forward to engage the post 32. When the body pivots in a counter clockwise direction 72, the forward end at part 56 moves down and rearwardly away from the post 32. The forward tip 74 of the post-engaging part 56 lies in high friction engagement with the post when it contacts the post, which prevents the body and float 30 from moving down.

When the flush handle is operated so the chain device 60 is pulled, it causes the rear end 76 of the body to move upward, that is, at least partially upward (with the rear end 76 lying below the axis 54, the rear end also moves rearward). As a result, the post-engaging part 56 moves out of contact with the post 32, and the float 30 can move down.

The buoyant body 42 has a center of buoyancy at 80 which always lies below the body axis. The term "center of buoyancy" is here used to define the center of net forces (due to buoyancy and weight) on the body when it is totally immersed in water 82. When the body is totally immersed, the force due to buoyancy is by far the largest force on the body. In FIG. 5, the center of buoyancy 80 lies a distance M forward of the pivot axis 54, so the body tends to pivot in the direction 70 to press the post-engaging tip 74 against the post 32.

FIG. 6 shows the body 42 immediately after the chain device 60 has been pulled to move the post-engaging part 56 away from the post 32, and has been released, but with the body 42 still totally immersed in water. Large pivoting of the body and its lower surface 75 has allowed some air to escape, and a new center of buoyancy of the tilted body is at 80A. As soon as the center of buoyancy (at 80 or 80A or in between) has moved to the right of the axis 54 (to the right of a vertical line 54V extending through the axis), buoyancy causes the body 42 to pivot counter clockwise 72 until the upper right corner 125 of body encounters the lower right corner 126 of the float 30. The body remains in this position until the water level drops below the body. Even if the body 42 has not pivoted quite enough for its center of buoyancy to pass to the right of the axis 54, the center of buoyancy would lie close to the axis line 54V so there would be insufficient torque to pivot the body back against the post before the water level dropped below the body.

FIG. 7 illustrates the position of the body 42 when the water level has dropped below the body and the body is no longer immersed in water, but is only immersed in air. The body has a center of gravity 82 which lies rearward of the center of buoyancy 80. The body 42 hangs from the mount 44 with its center of gravity 82 lying directly under the pivot axis 54. The center of buoyancy 80 then lies forward F (F extends horizontally) of the pivot axis. When the water level rises in the tank and the body becomes immersed in water, its center of buoyancy 80 causes body pivoting in the clockwise direction 70 until the tip 74 engages the post 32 as in FIG. 5. If the center of buoyancy 80 were to lie rearward of the center of gravity 82, then the body would not tend to pivot so its forward end at tip 74 engaged the post.

It may be noted that applicant prefers to use a chain device 60 of lightweight material such as plastic so it has only a small effect on the position of the body. However, the slight weight applied to the rear end 76 of the body is preferably taken into account when designing the body.

Figure 2:
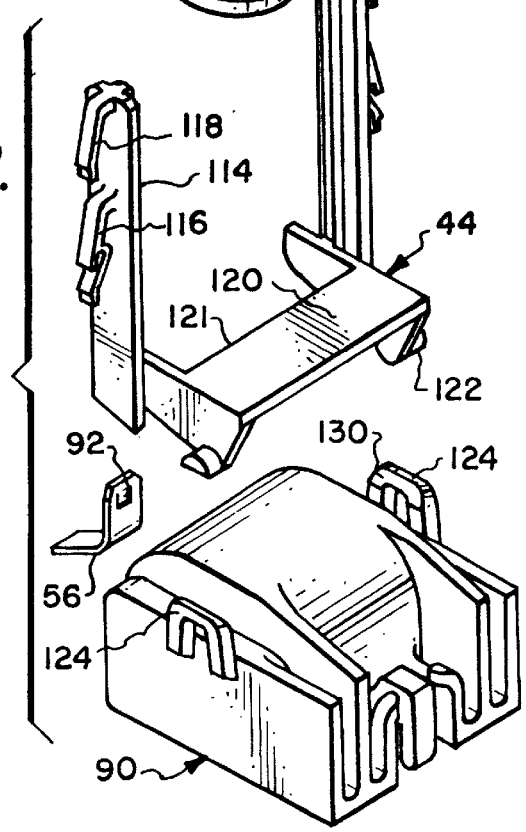
FIG. 2 is an exploded isometric view of the leak detector apparatus of FIG. 1.
Figure 13:
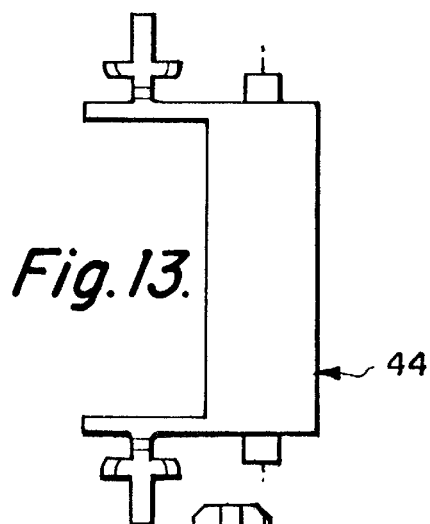
FIG. 13 is a plan view of the mount of the leak detector apparatus of FIG. 2.

The body 42 shown in FIG. 7, includes a plastic molded body part 90 and a strip of metal that forms the post-engaging part 56. FIG. 2 shows that the post-engaging part 56 has a tine 92, while FIG. 7 shows that the tine 92 is locked into a pocket 94 at the front of the body part 90. Although a strip of metal is preferred, any material harder than the plastic of the post 32 can be used instead. FIG. 8 shows that the tip 74 of the post-engaging part has a sharp edge 96. The sharp edge digs only slightly into the inlet valve post, but such digging in is sufficient to provide very high friction contact that prevents the post from moving down until the body is forcefully pivoted away.

It is noted that there is normally only a small force pressing the sharp edge 96 against the post, the small force being due to torque produced by the buoyancy of the body about the pivot axis of the body. When there is a leak that results in the water level dropping below the float, the float weight presses down through the mount 44 against the body 42, with the float weight supported through the post-engaging part 56 of the body on the post. Only in that case is there much force urging the sharp edge to dig into the post. Even then, the edge dig in only slightly to only slightly roughen the surface of the post.

The sharp edge 96 that form the tip 74 of the body, can be formed by scoring the strip of metal of the part 56, and bending it to break to leave burrs that form the sharp edge. Applicant prefers to machine the tip 74 to form the burrs or sharp edge 96. The tip 74 can engage a post 32 at a range of heights, so the leak detector is effective even if the height of the float 30 is raised or lowered. The tip can engage post surface locations that are angled moderately from the vertical.

FIG. 16 shows another post-engaging part 56A, wherein a quantity 100 of soft elastomeric material is attached to the front of the body. The elastomeric material 100 is used to provide high frictional contact with the post.

FIG. 4 shows that the float 30 has a bottom wall 110 with water drain holes 112, FIG. 1 showing the two holes 112. This is the construction of the float described in U.S. Pat. No. 4,703,653, and this construction is in wide use. The walls of the holes 112 do not project below the float bottom wall, and are not readily apparent. As indicated in FIG. 4, applicant constructs the mount 44 with a pair of upstanding mount posts 114 which are spaced apart by the spacing (27 millimeters) of the widely used float on inlet valves manufactured by Fluidmaster, Inc. The mount 44 is mounted on the float 30 by merely pressing the post parts 114 upwardly into the water drain holes 112. It is noted that the water drain holes 112 have a greater height than the rest of the float bottom wall 110. As shown in FIG. 2, each of the post parts 114 have hooks 116, 118 that hold the post parts in the float when they are pushed upwardly into the holes. The drain holes 112 are of circular cross-section, while the posts 114 are of rectangular section so they do not block the drain holes. Instead of using the post parts 114, applicant can provide nonwater-wetted contact adhesive on an upper surface 120 of the mount base 121 to bond it to the bottom of the float.

Figure 15:
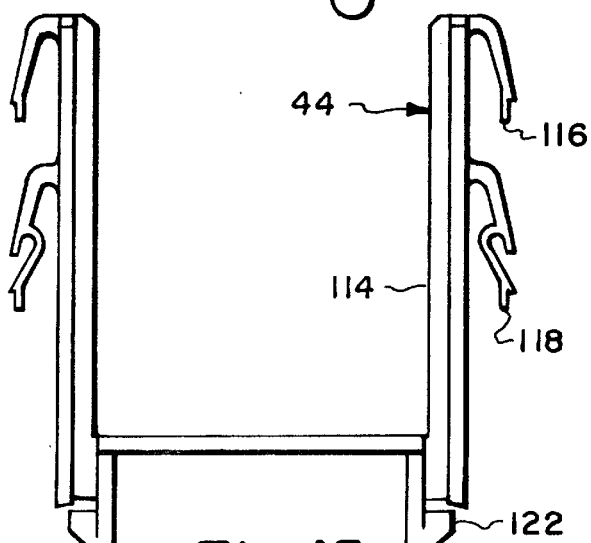
FIG. 15 is a rear elevation view of the mount of FIG. 13.

The mount 44 has a pair of trunnions 122 that are received in bearing ears 124 at the top of the body part 90. The inside surfaces of the ears are bevelled at their upper ends at 130, while the trunnions 122 are bevelled at the lower ends (as shown in FIG. 15). As a result, a handyman can install the mount 44 by pushing the post parts 114 into the air holes of the float, and then install the body part 90 on the mount by pushing the ears 124 upwardly to receive the trunnions 122. The flexible ears 124 facilitate such mounting, and also enable removal of the body part, if necessary.

Figure 10:
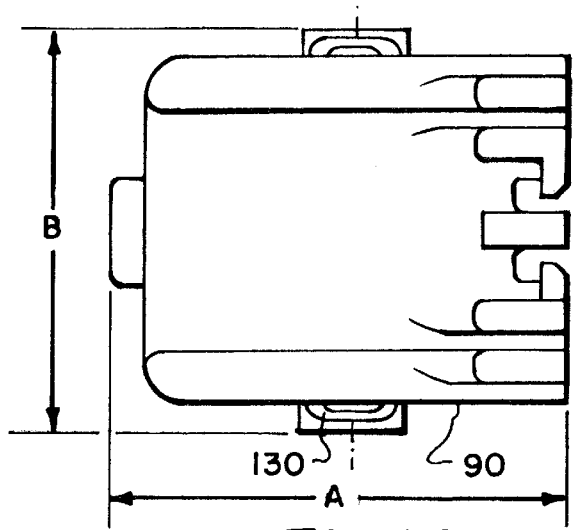
FIG. 10 is a plan view of the leak detector apparatus of FIG. 2.
Figure 14:
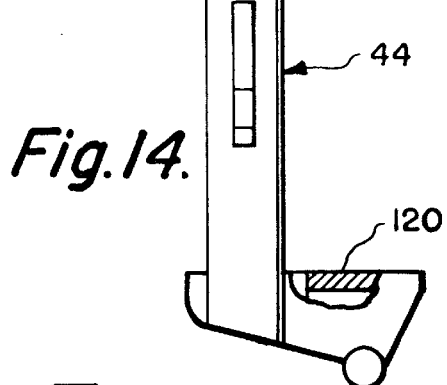
FIG. 14 is a side elevation view of the mount of FIG. 13.
Figure 11:
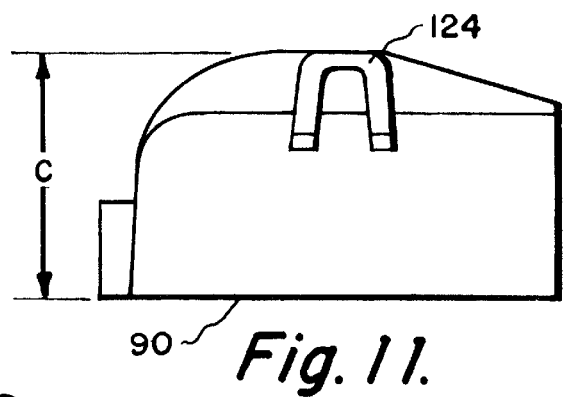
FIG. 11 is a side elevation view of the body part of FIG. 10.
Figure 12:
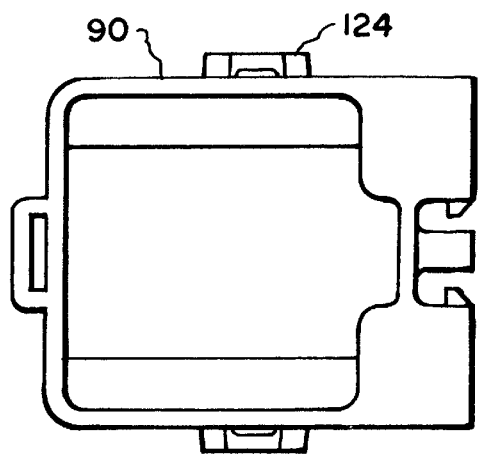
FIG. 12 is a bottom view of the body part of FIG. 10.

Applicant has constructed and successfully tested a leak detector apparatus of the type illustrated in FIGS. 1–15. The cup part had a front-to-rear length A (FIG. 10) of 30 millimeters, a width B of 27mm, a height C (FIG. 11) of 16mm, and other dimensions proportional to the above as illustrated in FIGS. 10–12. Although applicant has illustrated the buoyant body as being in the shape of an upside-down cup, a variety of buoyant body shapes can be used. It would be possible to construct a completely enclosed hollow body, preferably with a hole at the bottom to drain any water that might seep in. It is also possible to attach a piece of low density material such as foam, which has a density much less than that of water, to a rigid pivotally-mounted part to form the buoyant body.

Thus, the invention provides a leak detector of a construction that enables it to be readily installed. The leak detector includes a buoyant body that is pivotally supported on a mount that attaches to the inlet valve float. The body has a buoyancy that tends to pivot it in a direction that causes its front end to bear against the largely vertical post of the inlet valve, in high friction contact therewith, to prevent the float from moving down unless the body is pivoted away from the post, by a person operating a flush handle. The center of gravity of the body results in the unimmersed body properly positioning the center of buoyancy in readiness for body immersion. High friction between the front end of the body and the post can be obtained by forming the front end of a material harder than an engineering plastic of which the inlet valve post is formed, such as metal, and forming a sharp edge at the tip. The mount can include one or more upstanding posts that can be inserted into an air hole at the bottom of a float.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Leak detector apparatus for use with an inlet valve assembly which includes a vertical post, an inlet valve, and a float which is slidable vertically along said post and which is coupled to said inlet valve to open it when said float moves down and to close it when said float moves up, to prevent the float from moving down and opening the inlet valve to refill the tank as when water leaks through an outlet valve, said float having a lower portion that normally lies under water, comprising:

a buoyant body;
   a mount that is attachable to said float and that is connected to said body so said body can prevent said float from moving down to open said inlet valve when said body cannot move down, said mount being pivotally connected to said body about a body axis so said body lies under water when said float lower portion lies under water;
   said body having a body forward end portion that lies closest to said post with said forward end portion having a post-engaging part that engages said post to prevent downward movement of the body when said body pivots in a direction wherein said forward end portion moves upward and forward, and said body having a rear end portion which can be pulled up;
   said body having a center of buoyancy, when immersed in water with said post-engaging part lying adjacent to said post, which lies below and forward of said body axis to urge body pivoting to move said post-engaging part forwardly and upwardly against said post to prevent downward movement of the body and cause the body to prevent downward movement of the float when water leaks through the outlet valve.

2. The apparatus described in claim 1 wherein:
   said body has a center of gravity, when the water level is below said body so said body is out of the water, that is positioned so when said center of gravity lies directly under said body axis said center of buoyancy lies forward of said body axis, whereby when the water level rises above said body, said body pivots to move said post-engaging part against said post.

3. The apparatus described in claim 1 wherein:
   said float is of the type that has a bottom wall with at least one water drain hole therein;
   said mount includes a post part that projects upwardly into said water drain hole.

4. The apparatus described in claim 1 wherein:
   said body includes a plastic molded body part, and a metal part mounted on said body part, said metal part forming said post-engaging part with said metal part having a sharp edge which bites into said post.

5. The apparatus described in claim 1 wherein:
   said buoyant body comprises an upside-down cup with an open bottom that has an open bottom surface extending primarily horizontally when said body is not immersed in water.

6. The apparatus described in claim 1 wherein:
   said body forward end portion includes a quantity of elastomeric material that provides high friction contact with said post.

7. Leak detector apparatus for preventing a vertically-slidable float of a toilet inlet valve from moving down when the toilet tank water level falls as when water leaks through a toilet outlet valve, until a person operates a control, where the toilet inlet valve has a largely vertically extending post, wherein the apparatus includes a mechanism that is mounted on the float and that has a post-engaging part that can move against the post to prevent the apparatus from moving down so the apparatus supports the float from moving down, wherein:

said post-engaging part has a sharp edge which can automatically dig into the surface of said post to provide positioning of said float along said post to control the operation of said inlet valve.

8. The apparatus described in claim 7 wherein:

said mechanism includes a buoyant body, and a mount that is fixable to said float and that pivotally supports said body in pivoting about a horizontal axis, to enable the body to pivot under the influence of its weight and buoyancy, said body having a forward end lying closest to said post and said post-engaging part lying at said forward end to move toward and away from said post as said body pivots.

9. The apparatus described in claim 8 wherein:

said body includes a plastic molded body part, and said post-engaging part comprises a strip of metal mounted on said body part and projecting generally forwardly thereof.

10. In a toilet that includes a tank that can be filled to a predetermined level with water and an inlet valve assembly lying in said tank with said inlet valve assembly having a vertical post, an inlet valve on the post, and a float that is slidable along said post and that is coupled to said inlet valve to open it when said float slides down, and said toilet includes a control that is operated to start a flushing, the improvement of apparatus that prevents opening of the inlet valve if there is a leak, comprising:

a buoyant body pivotally mounted on said float about a body axis and lying under water when said tank is filled with water to support said float against sliding down, said body having front and rear ends with said front end having a post-engaging part that engages said post when said body pivots in a first direction about said body axis and that moves away from post when said body pivots in an opposite second direction about said body axis, said body having a center of gravity and having a center of buoyancy that lies at a predetermined position when said center of gravity lies directly under said body axis, said center buoyancy controlling the body position about said body axis when said body is immersed in water and is not otherwise forced to pivot;

a coupling that extends between said body and said control and that pivots said body in said second direction when said control is operated to start a flushing;

said center of gravity of said body being positioned so when it lies directly under said body axis said location of said center of buoyancy lies forward of said body axis, so when said body is out of water and then immersed in water its buoyancy tends to pivot said body to move said body front end against said post and prevent downward movement of said float when water leaks from said tank.

11. The toilet described in claim 10 wherein:

said body includes a plastic molded body part and a more rigid part with a sharp edge forming said post-engaging part.

12. A leak detector mount for mounting on a toilet inlet valve that includes a vertical inlet valve post and a float that can slide along the valve post to hold a leak detector that would prevent the float from sliding down if water leaks from a tank that surrounds at least part of the inlet valve, wherein the float has a bottom wall with at least one water drain hole therein, comprising:

a mount for holding said leak detector having a base part and at least one post part extending upwardly from said base part and insertable into said water drain hole, said post part having a cross-section that avoids complete blocking of said water drain hole to allow maintenance of a selected amount of water in the float.

13. The mount described in claim 12 wherein:

said post part has a resilient hook for hooking itself in place within said float.

14. The mount described in claim 12 wherein:

said float has a pair of water drain holes, said mount includes a pair of post parts that are each insertable into one of said water drain holes, with each post part having a part for holding itself to one of said drain holes; and including a body that is pivotally mounted on said base.

* * * * *